US009152702B2

(12) United States Patent
Lempel et al.

(10) Patent No.: US 9,152,702 B2
(45) Date of Patent: Oct. 6, 2015

(54) SYSTEM AND METHOD FOR SELECTING SEARCH RESULTS FACETS

(75) Inventors: Ronny Lempel, Haifa (IL); Sonya Liberman, Jerusalem (IL)

(73) Assignee: YAHOO! INC., Sunnyvale, CA (US)

( * ) Notice: Subject to any disclaimer, the term of this patent is extended or adjusted under 35 U.S.C. 154(b) by 689 days.

(21) Appl. No.: 12/757,227

(22) Filed: Apr. 9, 2010

(65) Prior Publication Data
US 2011/0252013 A1    Oct. 13, 2011

(51) Int. Cl.
*G06F 7/00*  (2006.01)
*G06F 17/30*  (2006.01)

(52) U.S. Cl.
CPC .... *G06F 17/30696* (2013.01); *G06F 17/30705* (2013.01); *G06F 17/30864* (2013.01); *G06F 17/30867* (2013.01)

(58) Field of Classification Search
CPC .............. G06F 17/30864; G06F 17/30867
USPC .................................. 707/706, 708
See application file for complete search history.

(56) References Cited

U.S. PATENT DOCUMENTS

| | | | | |
|---|---|---|---|---|
| 7,493,319 | B1 * | 2/2009 | Dash et al. | 1/1 |
| 8,265,925 | B2 * | 9/2012 | Aarskog | 704/9 |
| 2002/0103789 | A1 * | 8/2002 | Turnbull et al. | 707/3 |
| 2003/0014399 | A1 * | 1/2003 | Hansen et al. | 707/3 |
| 2003/0033287 | A1 * | 2/2003 | Shanahan et al. | 707/3 |
| 2003/0061200 | A1 * | 3/2003 | Hubert et al. | 707/3 |
| 2006/0122876 | A1 * | 6/2006 | Von Schweber et al. | 705/10 |
| 2007/0112740 | A1 * | 5/2007 | Geva | 707/3 |
| 2007/0156677 | A1 * | 7/2007 | Szabo | 707/5 |
| 2008/0027932 | A1 * | 1/2008 | Brunner et al. | 707/6 |
| 2009/0106244 | A1 * | 4/2009 | Dash et al. | 707/6 |
| 2009/0241066 | A1 * | 9/2009 | Costello | 715/843 |
| 2009/0322756 | A1 * | 12/2009 | Robertson et al. | 345/440 |
| 2011/0125764 | A1 * | 5/2011 | Carmel et al. | 707/749 |

OTHER PUBLICATIONS

Van Mechelen, Iven, "The conjunctive model of hierarchical classes," Psychometrika, Dec. 27, 1995, Springer New York, pp. 505-521.*

* cited by examiner

*Primary Examiner* — Mark E Hershley
(74) *Attorney, Agent, or Firm* — Pillsbury Winthrop Shaw Pittman LLP

(57) ABSTRACT

The present invention is directed towards systems and methods for providing a plurality of facets in response to a search query. The method according to one embodiment of the present invention comprises receiving a search query from a user and retrieving a search result set. The method then identifies an optimum number of facets and selects a plurality of facets with a maximum incremental value. Finally, the method provides the search result set and the selected facets to a user.

24 Claims, 4 Drawing Sheets

SYSTEM AND METHOD FOR SELECTING SEARCH RESULTS FACETS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to optimizing the facet selection problem for a search engine results page ("SERP"). More specifically, embodiments of the present invention are directed towards systems and methods for identifying one or more facets for a given search query and providing refined search results on the basis of one or more selected facets.

BACKGROUND OF THE INVENTION

As the Internet continually expands, the amount of content available to users grows exponentially. This growth has rendered manual searching techniques virtually ineffective and has facilitated the growth of automated search agents, such as search engines. Search engines providing an index of a large set of documents offer clear efficiency advantages over directory listings and other formats requiring laborious user effort.

Profitability through user retention is a primary goal of any successful major search engine. In order to retain the maximum number of users, a search engine must provide, ideally, the most relevant results at all times. The task of maximizing efficiency of indexing and retrieval algorithms is a formidable one and spans across multiple disciplines and technologies. One particular method of optimizing search results is to provide facets in response to a search query. According to one embodiment, a facet is a generic term describing a mechanism that may be used to narrow a result set, which may be made on the basis of a term or phrase.

The current state of the art fails to fully exploit the power of facet-based refinement. Currently, the most substantial uses of facets comprise using a stock facet set for a given category of query. For example, a search for a disease or illness may return a generic set of facets (e.g., "symptoms", "treatments", etc.) for every disease or illness categorized by the search engine. These techniques suffer from a lack of sophistication, failing to both exploit the uniqueness of a search query and generate query and result set-specific facets. Thus, there is a need in the current state of the art for systems, methods and computer program products that provide query and result set-based facets for a search results page.

SUMMARY OF THE INVENTION

The present invention is directed towards systems and methods for providing one or more facets in response to a search query. The method of the present invention comprises receiving a search query from a user and retrieving a search result set. The method identifies an optimum number of facets. In one embodiment, the optimum number of facets comprises a pre-computed value. In an alternative embodiment, the optimum number of facets comprises a dynamically generated value formulated on the basis of the search result set.

The method may select one or more facets with a maximum incremental value. In one embodiment, selecting one or more facets with a maximum incremental value comprises selecting a facet providing the maximum value associated with a user drill-down model. In alternative embodiment, a user drill-down model may comprise a conjunctive drill-down model or a best facet drill down model.

The method may provide the search result set and the optimal facets to a user. In one embodiment, providing the search result set and the selected facets to a user comprises providing a search results page containing the result set and the selected facets. In one embodiment, the method may further be operative to receive one or more facets selected by a user and refine the search result set based on the facets selected by a user. In one embodiment, refining the search result set comprises refining the set based on a plurality of aggregated facets selected by a user. In an alternative embodiment, refining the search result set comprises refining the set based on a single facet selected by a user.

The system of the present invention comprises both one or more client devices and a search engine coupled to a network, the search engine operative to receive a search query from a user and generate a search result set. The search engine may be operative to identify an optimum number of facets. In one embodiment, the search engine is operative to calculate an optimum number of facets on the basis of a pre-computed value. In an alternative embodiment, the search engine is operative to calculate an optimum number of facets based on a dynamically generated value, e.g., on the basis of the search result set.

The search engine may also be operative to select one or more facets with a maximum incremental value. In one embodiment, selecting facets with a maximum incremental value comprises selecting a given facet that provides the maximum value associated with a user drill-down model. In alternative embodiment, a user drill-down model may comprise a conjunctive drill-down model or a best facet drill down model.

The search engine may also provide the search result set and any selected facets to a given client device, which may include transmission to a plurality of client devices. In one embodiment, providing the search result set and the selected facets to a client device comprises providing a search results page containing the result set and the selected facets. In alternative embodiment, the search engine may receive a plurality of facets selected by a user and refine the search result set on the basis of the facets that the user selects. In one embodiment, refining the search result set comprises refining the set on the basis of one or more aggregated facets that a user selects. In an alternative embodiment, refining the search result set comprises refining the set based on a single facet a user selects.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
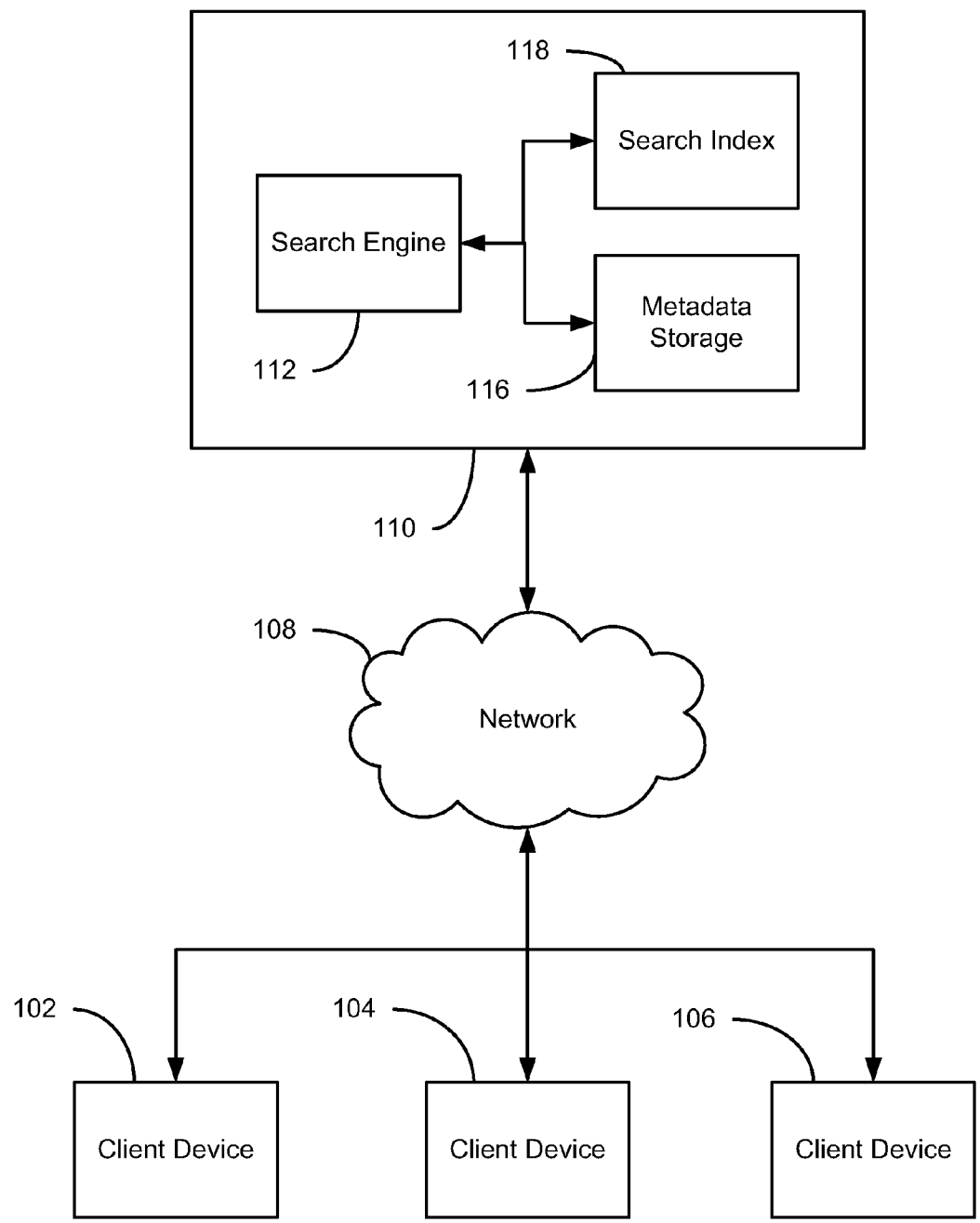
FIG. 1 presents a block diagram depicting a system for providing search result facets according to one embodiment of the present invention.

FIG. 1 presents a block diagram depicting a system for providing search result facets according to one embodiment of the present invention. As the embodiment of FIG. 1 illustrates, a plurality of client devices 102, 104 and 106 are connected to a search provider 110 via a network 108. According to the embodiment of FIG. 1, the search provider 110 comprises a search engine 112; a search index 114; and metadata storage 116.

Client devices 102, 104 and 106 may comprise general purpose computing devices (mobile or otherwise) having a central processing unit, memory unit, permanent storage, optical drive(s), universal serial bus port(s), audio/video output devices, network interfaces, etc. Client devices 102, 104 and 106 are operative to communicate via network 108, which may comprise a local or wide area network such as the Internet. In the present embodiment, client devices 102, 104 and 106 transmit requests to content provider 110 via the HTTP, WAP or similar protocol for the client/server exchange of text, images and other data.

Client devices 102, 104 and 106 may be operative to transmit a request for search results or a request for facet refinement to search provider 110. In the embodiment of FIG. 1, search engine 112 is operative to receive client requests for search results or facet refinement. Search engine 112 may receive requests for search results via a web interface such as an HTML-based search engine page. Client devices 102, 104 and 106 may transmit search strings to search engine 112 via an HTTP request action. Search engine 112 may, in turn, query search index 114 and select a plurality of relevant documents representing a search result set. Methods of indexing and retrieving relevant documents may be accomplished via any method known in the art of search engine indexing.

Additionally, in response to a search query, search engine 112 may query metadata storage 116 to identify one or more facets associated with a given search query. In one embodiment, metadata storage 116 may store a plurality of facets associated with a given document (e.g., search result). For example, metadata storage 116 may comprise a relational database establishing links between a document and facet identifiers. Alternatively, or in conjunction with the foregoing, metadata storage 116 may dynamically generate a list of facets associated with a given search document. For example, metadata storage 116 may return the values of "animals," "cars," "reviews" and "video games" for a document containing the term "jaguar". The returned facets indicate topical areas of interest generated on the basis of the retrieved document. In the preceding example, the term "jaguar" may refer to one or more broad topical areas including, but not limited to, the animal, the car manufacturer or a video game console. Upon retrieving a plurality of documents with facet metadata, the system may then generate a facet list on the basis of the aggregated facets.

After identifying a result set and list of facets, the search engine 112 may transmit the retrieved data to client devices 102, 104 and 106. In one embodiment, transmitting the result set and facets may comprise transmitting a search engine results page containing the retrieved data. The search engine 112 may further be operative to process requests for facet refinement. In one embodiment, a facet refinement request may comprise an HTTP request identifying the search query and the request facet or list of facets. In response to a facet refinement request, the search engine 112 may query search index 114 and retrieve a refined result set based on the facet(s).

Figure 2:
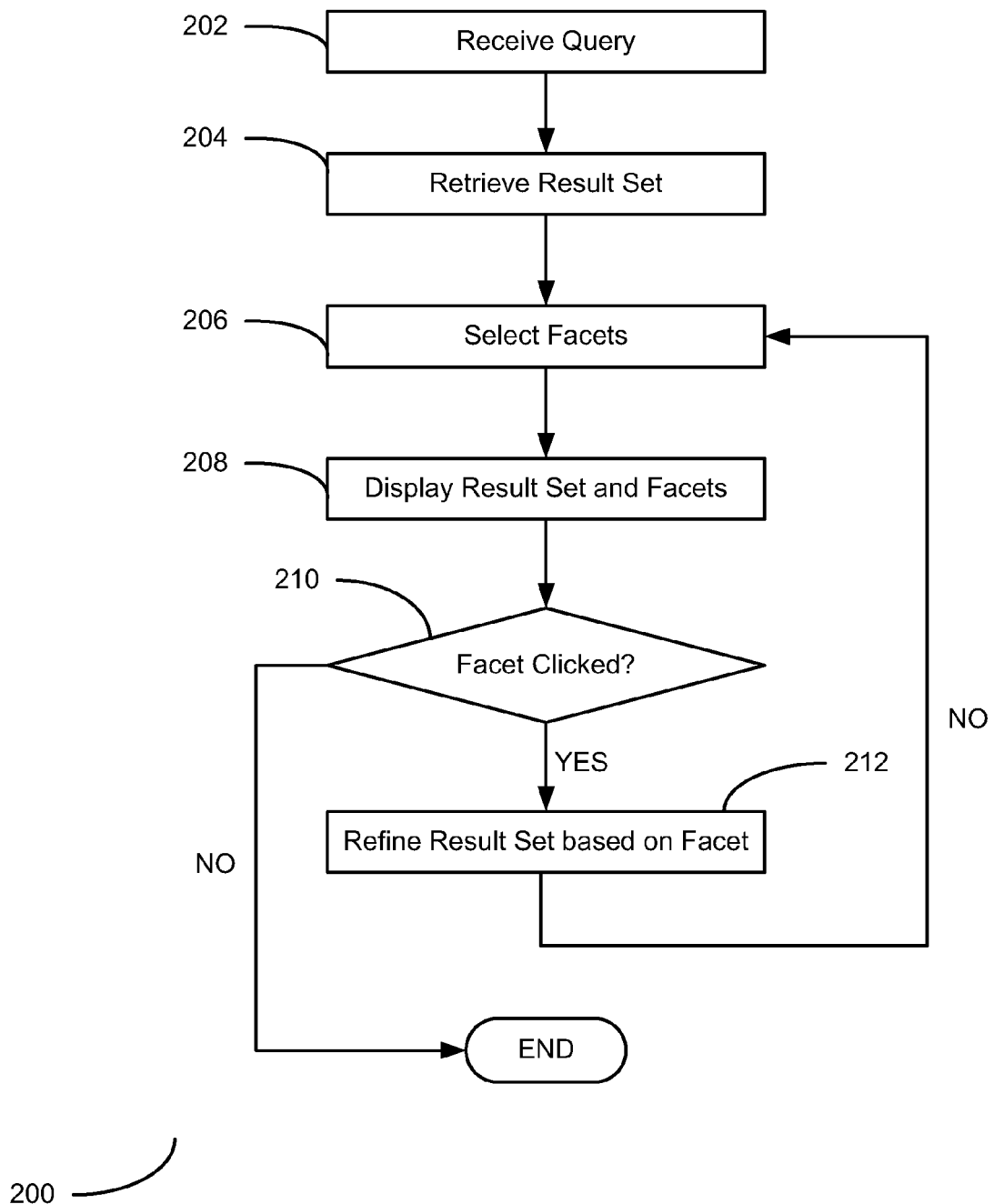
FIG. 2 presents a flow diagram illustrating a method for providing facets in response to a search query according to one embodiment of the present invention.

FIG. 2 presents a flow diagram illustrating a method for providing one or more facets in response to a search query according to one embodiment of the present invention. According to the embodiment that FIG. 2 illustrates, a method 200 receives a query, step 202, which in accordance with one embodiment comprises receiving a textual string from a user. For example, a user may enter a search query into an HTML text box and submit the query to a search engine via an HTTP request.

After receiving a search query, the method 200 may retrieve a result set, step 204, which in accordance with one embodiment may comprise accessing a search index to identify one or more results associated with a given search query, e.g., a result set that is responsive to the search query. Alternatively, method 200 may select a plurality of search results according to a predefined search engine algorithm.

The method 200 identifies one or more facets for selection, step 206. In one embodiment, the method 200 identifies a plurality of facets for selection on the basis of a pre-computed model. The method 200 may optimize the list of facets for selection by determining those facets having the highest incremental value. In a first embodiment, the method 200 may utilize a conjunctive drill-down model (U) illustrated in Equation 1:

$$U_q^{M_C}(F_q) = E[X \mid q] - E_{M_C}[X \mid q, F_q] \qquad \text{Equation 1}$$
$$= \sum_{d \in \mathcal{D}_q : r_q(d) > m} p(d = d_q) |D_{q,d,F_q}|$$

The conjunctive drill-down model utilizes a selection mechanism, which is typically a control presented as part of a user interface. During facet exploration, the user may drill down into several facts simultaneously by through the simultaneous selection of multiple facets. Consequently, the new search results contain those document associated with the selected facets, which may be presented in the same relative order in which those documents appeared in the ranked result set for the original query.

Alternatively in a second embodiment, the method 200 may utilize a best facet drill-down model (U) illustrated in Equation 2:

$$U_q^{M_B}(F_q) = E[X \mid q] - E_{M_B}[X \mid q, F_q] \qquad \text{Equation 2}$$
$$= \sum_{d \in \mathcal{D}_q : r_q(d) > m} p(d = d_q) \max_{f \in F_{q,d}} |D_{q,d,f}|$$

The best facet drill-down model assumes that when a user is searching for a document in a result set and scanning one or more facets a search engine may display in conjunction with the given query the user submits, the user identifies the single facet that has the most pronounced effect on promoting the target document, e.g., the user identifies the "best drill-down" option.

To better understand both the conjunctive and best facet drill-down models, it should be noted by those of skill in the art that $D_q$ denotes the set of documents that a search engine considers relevant to a given query and that for all $d \in \mathcal{D}_q$ let $r_q(d)$ denote the rank of document d with respect to the query q. A random variable X may be defined as the effort invested by a user before reaching a target document, which, by the above, $$X = \begin{cases} 0 & r_q(d_q^u) \leq m \\ r_q(d_q^u) & r_q(d_q^u) > m \text{ and no drilldown} \\ \text{rank of } d_q^u \text{ in } \mathcal{D}_q^{fil} & \text{otherwise.} \end{cases}$$

Next, let $p(d=d_q)$ denote the probability, taken over all users, of d being the target document for q, noting that when user are presented with ranked search results only, the expected effort to reach a target document for query q is $$E[X \mid q] = \sum_{d \in \mathcal{D}_q : r_q(d) > m} p(d = d_q) r_q(d).$$

Finally, a k-facet selection problem is formulated with respect to a query q and given drill-down model M as $$F_k^{OPT}(q, M) = \arg\max_{F \subseteq \mathcal{F} : |F| \leq k} U_q^M(F)$$

where k is the size of the facet subset to the shown to users.

Table 1 presents additional notations that may be useful by those of skill in the art in understanding the facet selection problem and drill-down models described above.

TABLE 1

| | |
|---|---|
| $\mathcal{D}$ | Document corpus |
| $\mathcal{D}_q \subseteq \mathcal{D}$ | Documents returned for query q |
| $\mathcal{F}$ | Set of facets available to the engine |
| $F_q \subseteq \mathcal{F}$ | Facets returned by the engine for query q |
| $C: \mathcal{D} \to 2^{\mathcal{F}}$ | the classification function that maps each document into a subset of facets |
| $d_q^u$ | Target document of user u for query q |
| $r_q(d), d \in \mathcal{D}_q$ | Rank of document d in $\mathcal{D}_q$ |
| $p(d = d_q)$ | Probability, over all users, of document d being the target document for query q |
| X | Random variable indicating user effort |
| $E_M[X|q, F]$ | Expected effort for query q under drill-down model M, given that facet set F is shown |
| $U_q^M(F)$ | Utility of showing facet subset F for query q under drill-down model M |
| $F^{OPT}_k(q, M)$ | Optimal subset of up to k facets to show for query q under drill-down model M |

The method 200 selects one or more facets for displayed in conjunction with the retrieved result set, step 208. In one embodiment, displaying facets and a result set comprises transmitting the facets and result set to a user device. In response to receiving the result set and facets, an application (such as a web browser) may be operative to display the result set and facets using display techniques that are known to those of skill in the art. In one embodiment, the result set and facets may comprise executable code allowing interaction with the set and facets. For example, a result set and facets may comprise a combination of HTML, JavaScript and substantive content.

The method 200 may determine if a user selects a given facet, step 210. In one embodiment, determining if a user clicks on a facet may comprise executing various combinations of local and remote program code, e.g., JavaScript program code, in response to a user click. For example, a given facet may contain an event handler for monitoring a user's click and implementing an action upon occurrence of the event. In an alternative embodiment, a given facet may comprise a hyperlink to a search engine. For example, a facet may be hyperlinked to an executable program located at a search engine.

If the user does not select a facet, the method 200 continues to display the set of facets and search result set. If the user selects a facet, the method 200 refines the result set based on the selected facet, step 212. In accordance with one embodiment, refining a result set on the basis of a facet that the user selects comprises querying a search index and limiting the returned links in accordance with the text that may be associated with the facet. A search index query may identify the search terms as well as a limiting categorical descriptor. For example, a refined query may contain a search query "jaguar" and specify a limiting category such as "video game."

Figure 3A:
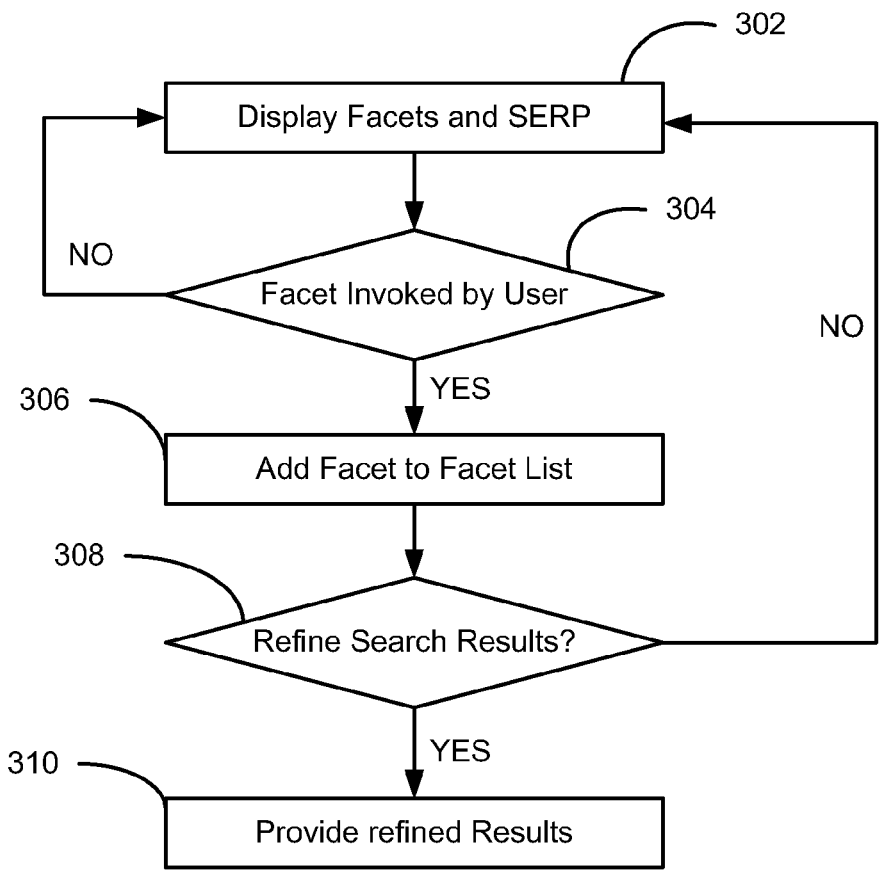
FIGS. 3a and 3b present flow diagrams illustrating methods for refining search results on the basis of one or more selected facets according to one embodiment of the present invention.
Figure 3B:
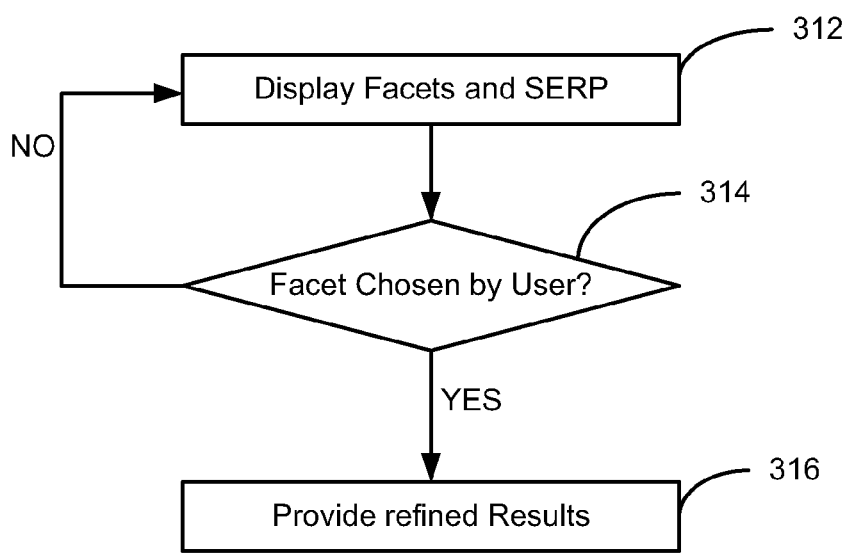

FIGS. 3a and 3b illustrate two embodiments of a method for refining search results on the basis of one or more facets that a user may select. As the embodiment of FIG. 3a illustrates, one or more facets are provided to a user, step 302. Providing facets to a user may comprise transmitting one or more facets in response to a search query, as previously described in conjunction with other embodiments of the invention. The method 300a may detect whether a user selects a given facet, step 304.

Upon determining that a facet has been selected, the method 300a may add the facet to a facet list, step 306. In one embodiment, adding a facet to a facet list may comprise storing a facet identifier in a data structure, which may be stored remotely or on a user device. For example, JavaScript code may be operative to store the facet identifier in a data structure, such as a string or array of strings. Alternatively, program code may identify the selection of a facet and transmit information regarding the selected facet to a search engine or other remote application for storage. For example, an AJAX method may be utilized to asynchronously transmit the facet identifier to a search engine.

The method may determine if the user wishes to refine the search results, step 308. If the method 300a determines the user does not wish to refine the search results, the method 300a continues to provide a list of facets 302. Alternatively, if the method 300a determines the user wishes to refine the search results, the method 300a may provide the refined search results to the client device of the user, step 310. In one embodiment, providing refined search results may comprise filtering a first set of search results using the selected facets. For example, for a given query "jaguar", a plurality of facets may comprise "animals", "cars", "reviews" and "video games". In steps 304 and 306 a user may select facets "cars" and "reviews". To refine the search results, step 310, the method may filter the first set of search results in a manner such that only those search results directed to reviews of cars are selected.

According to the embodiment that FIG. 3b illustrates, a method 300b provides one or more facets, step 312. Providing facets to a user may comprise transmitting one or more facets in response to a search query, as previously discussed. The method 300a detects whether a user has selected a given facet, step 304. If the method 300b determines that a user has not selected a facet, the method 300b continues providing the facets (e.g., continuing the display of facets on a user device). Alternatively, if the method 300b determines that a user has selected a facet, the method 300b then provides a plurality of refined search results. Providing refined search results may comprise steps similar to that described in conjunction with step 310 of FIG. 3a.

Figure 4:
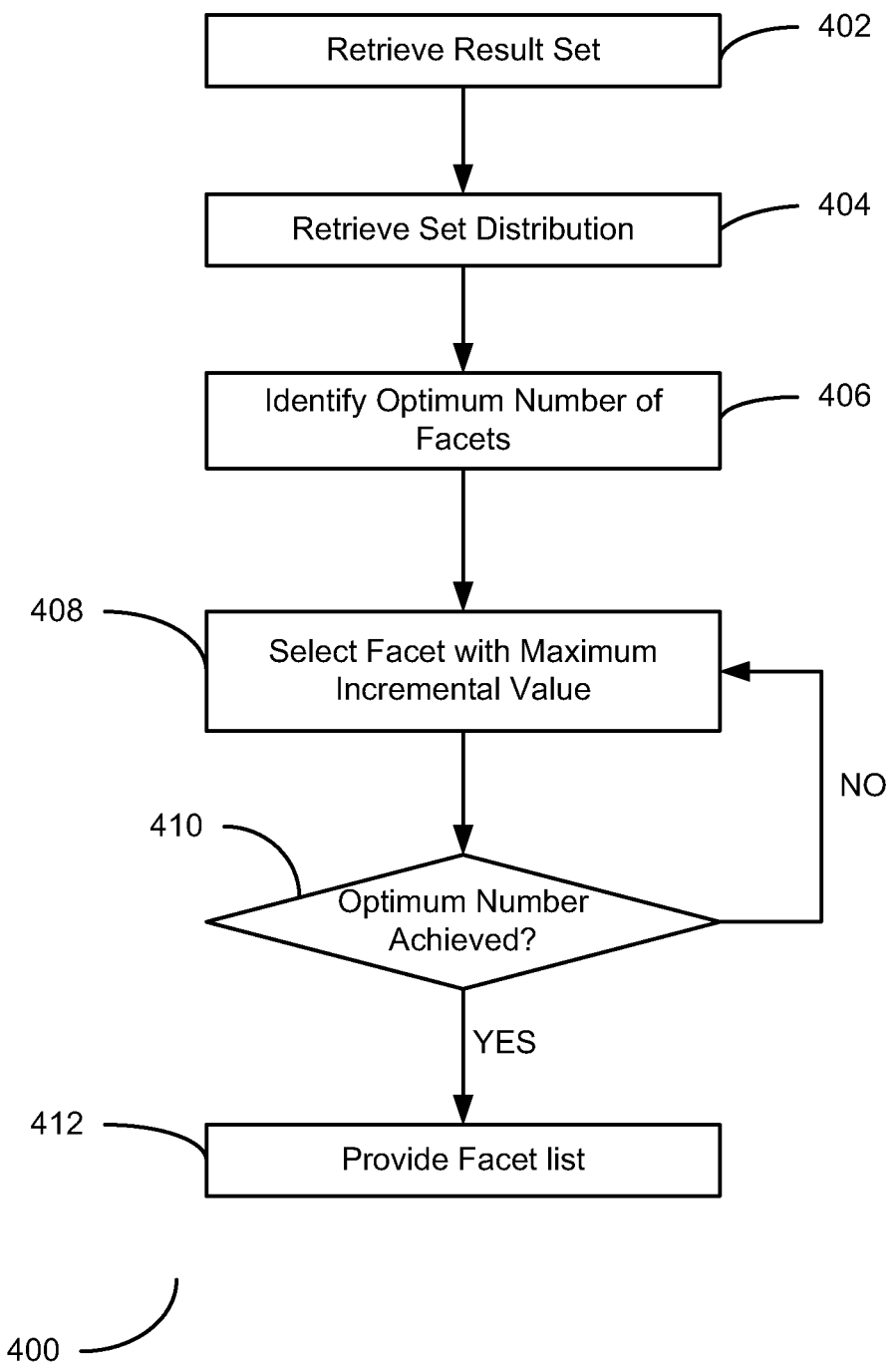
FIG. 4 presents a method for generating a list of facets for a set of search results according to one embodiment of the present invention.

FIG. 4 illustrates a method for generating a list of facets for a set of search results according to one embodiment of the present invention. As the embodiment of FIG. 4 illustrates, a method 400 retrieves a result set, step 402. As previously discussed, retrieving a result set may comprise querying a search index or similar, suitable method.

The method 400 then retrieves a set distribution, step 404. In one embodiment, a set distribution may comprise a probability distribution of a given search result being selected for a given search query. In one embodiment, a probability distribution comprises the probability, taken over all users, that a given document comprises the target document for a given query. The method 400 may automatically generate the probability distribution or may receive the distribution from a pre-computed source. Generating a probability distribution may be based in part on analytic data such as the click through rate, number of clicks, or any other metric used to calculate the relevancy of a given search result. On the basis of the set distribution, the method 400 identifies an optimum number of facets, step 406. In one embodiment, an optimum number of facets may be a constant value. In an alternative embodiment, an optimum number of facets may be computed at run-time based on the received search query.

The method 400 may selects a facet with the maximum incremental value, step 408. In one embodiment, the method 400 utilizes a facet model as previously described to determine the maximum incremental value. Selecting a facet with the incremental value may comprise selecting a facet that provides the maximum value of the output of a given facet model. In one embodiment, a maximum value may correspond to the probability that a given facet will result in the desired search result for a given query.

If the optimum number of facets has been achieved, step 410, the method 400 provides a facet list to a user, step 412. As previously described, providing a facet list may comprise transmitting a search engine results page containing a list of facets for a given search query. If the method 400 determines that the optimum number of facets has not yet been reached, the method 400 program flow returns to step 408 until the optimum number is reached. Alternatively, the method 400 may execute step 408 until all facets have been determined.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method, implemented on a machine having at least one processor, storage, and a communication platform connected to a network, for providing a response to a search query, the method comprising:

receiving a search query from a user;

retrieving a search result set that comprises a plurality of search results with respect to a plurality of facets of the search query, each of the plurality of search results having a respective ranking;

identifying a number of facets to be selected from the plurality of facets based on a probability distribution that a given search result in the search result set is a search result desired by the user for the search query;

obtaining a model constructed based on the probability distribution and expected reduction of effort made by the user to reach the search result desired by the user given that the plurality of facets are shown to the user;

selecting the number of facets from the plurality of facets, wherein each of the selected number of facets is associated with a maximum incremental value of the expected reduction of effort in accordance with the model; and providing the selected number of facets in response to the search query.

2. The method of claim 1, wherein the identified number is based on a pre-computed value.

3. The method of claim 1 wherein the identified number comprises a dynamically generated value based on the search result set.

4. The method of claim 1, wherein the model comprises a user drill-down model.

5. The method of claim 4, wherein the user drill-down model comprises a conjunctive drill-down model.

6. The method of claim 5, wherein the conjunctive drill-down model comprises a model according to the function:

$$U_q^{M_C}(F_q) = E[X \mid q] - E_{M_C}[X \mid q, F_q] = \sum_{d \in \mathcal{D}_q : r_q(d) > m} p(d - d_q) |D_{q,d,F_q}|.$$

7. The method of claim 4, wherein the user drill-down model comprises a best facet drill-down model.

8. The method of claim 7, wherein the best facet drill-down model comprises a model according to the function:

$$U_q^{M_B}(F_q) = $$
$$E[X \mid q] - E_{M_B}[X \mid q, F_q] = \sum_{d \in \mathcal{D}_q : r_q(d) > m} p(d - d_q) \max_{f \in F_{q,d}} |D_{q,d,f}|.$$

9. The method of claim 1, wherein the providing the selected number of facets comprises providing a search results page containing the selected number of facets.

10. The method of claim 1 further comprising:
receiving one or more facets selected by a user from the selected number of facets; refining the search result set based on the one or more facets selected by the user.

11. The method of claim 10, wherein the refining the search result set comprises aggregating the facets selected by the user, and refining the search result set based on the aggregated facets.

12. The method of claim 10, wherein the refining the search result set comprises refining the search result set based on a single facet selected by the user.

13. A system having at least one processor, storage, and a communication platform connected to a network for providing a response to a search query, the system comprising:

a search provider implemented on the at least one processor and operative to:

receive a search query from a user;

generate a search result set that comprises a plurality of search results with respect to a plurality of facets of the search query, each of the plurality of search results having a respective ranking;

identify a number of facets to be selected from the plurality of facets based on a probability distribution that a given search result in the search result set is a search result desired by the user for the search query;

obtain a model constructed based on the probability distribution and expected reduction of effort made by the user to reach the search result desired by the user given that the plurality of facets are shown to the user;

select the number of facets from the plurality of facets, wherein each of the selected number of facets is associated with a maximum incremental value of the expected reduction of effort in accordance with the model; and provide the selected number of facets in response to the search query.

14. The system of claim 13, wherein the identified number is based on a pre-computed value.

15. The system of claim 13, wherein the identified number comprises a dynamically generated value based on the search result set.

16. The system of claim 13, wherein the model comprises a user drill-down model.

17. The system of claim 16, wherein the user drill-down model comprises a conjunctive drill-down model.

18. The system of claim 17, wherein the conjunctive drill-down model comprises a model according to the function:

$$U_q^{M_C}(F_q) = E[X \mid q] - E_{M_C}[X \mid q, F_q] = \sum_{d \in \mathcal{D}_q : r_q(d) > m} p(d - d_q) |D_{q,d,F_q}|.$$

19. The system of claim 16, wherein the user drill-down model comprises a best facet drill-down model.

20. The system of claim 19, wherein the best facet drill-down model comprises a model according to the function:

$$U_q^{M_B}(F_q) = $$
$$E[X \mid q] - E_{M_B}[X \mid q, F_q] = \sum_{d \in \mathcal{D}_q : r_q(d) > m} p(d - d_q) \max_{f \in F_{q,d}} |D_{q,d,f}|.$$

21. The system of claim 13, wherein the search provider is further operative to provide a search results page containing the selected number of facets.

22. The system of claim 13, wherein the search provider is operative to: receive one or more facets selected by a user from the selected number of facets; refine the search result set based on the one or more facets selected by the user.

23. The system of claim 22, wherein the refining the search result set comprises aggregating the facets selected by the user, and refining the search result set based on the aggregated facets.

24. The system of claim 22, wherein the refining the search result set comprises refining the search result set based on a single facet selected by the user.

* * * * *